United States Patent
Ishikawa et al.

(10) Patent No.: US 9,309,959 B2
(45) Date of Patent: Apr. 12, 2016

(54) POWER TRANSMISSION DEVICE (75) Inventors: Tomoyuki Ishikawa, Anjo (JP); Tatsuaki Ito, Anjo (JP)

(73) Assignee: AISIN AW CO., LTD., Aichi-Ken (JP)

(*) Notice: Subject to any disclaimer, the term of this patent is extended or adjusted under 35 U.S.C. 154(b) by 201 days.

(21) Appl. No.: 14/234,846

(22) PCT Filed: Aug. 22, 2012

(86) PCT No.: PCT/JP2012/071146
§ 371 (c)(1),
(2), (4) Date: Jan. 24, 2014

(87) PCT Pub. No.: WO2013/047018
PCT Pub. Date: Apr. 4, 2013

(65) Prior Publication Data
US 2014/0213405 A1  Jul. 31, 2014

(30) Foreign Application Priority Data
Sep. 29, 2011 (JP) ................. 2011-214712

(51) Int. Cl.
*F16H 57/04* (2010.01)
*F16H 57/027* (2012.01)

(52) U.S. Cl.
CPC ............ *F16H 57/043* (2013.01); *F16H 57/027* (2013.01); *F16H 57/0423* (2013.01); *F16H 57/0471* (2013.01); *F16H 57/0493* (2013.01); *Y10T 74/19991* (2015.01)

(58) Field of Classification Search
CPC ............... F16H 57/0423; F16H 57/027

USPC .................. 184/6, 6.12; 123/196 R; 475/160; 74/467
See application file for complete search history.

(56) References Cited

U.S. PATENT DOCUMENTS

| | | | |
|---|---|---|---|
| 2007/0066440 A1 | 3/2007 | Kitahara et al. | |
| 2011/0192245 A1* | 8/2011 | Shioiri | F16H 57/0423 74/467 |
| 2011/0245009 A1 | 10/2011 | Shibayama et al. | |

FOREIGN PATENT DOCUMENTS

| | | |
|---|---|---|
| JP | 62-13261 U | 1/1987 |
| JP | 62-45463 U | 3/1987 |
| JP | 63-53068 U | 4/1988 |
| JP | 2003-161362 A | 6/2003 |
| JP | 2007-85409 A | 4/2007 |
| WO | 2011/122192 A1 | 10/2011 |

* cited by examiner

*Primary Examiner* — William E Dondero
*Assistant Examiner* — Mark K Buse
(74) *Attorney, Agent, or Firm* — Sughrue Mion, PLLC (57) ABSTRACT

A power transmission device having a shift device in a case; and a pump sucking and discharges oil, including: a gear receiving power from the shift device; a gear shaft with a breather chamber having at least one end side in an axial direction being opened, and attached to the gear; a bearing supporting the gear shaft rotatably relative to the case on the breather chamber one end side; a vent pipe communicating with the breather chamber opening and outside of the case; a passage in the case with an outlet port opening to the case inside, and allowing pump leakage oil to flow from the outlet port; a member receiving flowing from the outlet port of the passage; a passage guiding the leakage oil from the receiving member to the bearing; and a portion suppressing entry of oil thrown up with rotation of the gear into the receiving member.

6 Claims, 7 Drawing Sheets

POWER TRANSMISSION DEVICE

This application is a National Stage of International Application No. PCT/JP2012/071146, filed on Aug. 22, 2012, which claims priority from Japanese Patent Application No. 2011-214712, filed on Sep. 29, 2011, the contents of all of which are incorporated herein by reference in their entirety.

BACKGROUND OF THE INVENTION

The present invention relates to power transmission devices including a shift device that is accommodated in a case, and an oil pump that suctions and discharges hydraulic oil.

DESCRIPTION OF THE RELATED ART

Conventionally, as this type of power transmission devices, a power transmission device is known which has an oil pump that is disposed between a pump housing and a pump cover defining a first accommodating chamber accommodating a torque converter and a second accommodating chamber accommodating a planetary gear train of a transmission, and that supplies hydraulic oil to the torque converter and the transmission (see, e.g., Japanese Patent Application Publication No. 2007-85409 (JP 2007-85409 A)). In this power transmission device, a lubricating oil passage is formed in the pump housing, and a lubricating oil supply port extending through the pump cover is formed in the pump cover at a position matching the lubricating oil passage. A communication groove that allows the lubricating oil supply port to communicate with the clutch plate side of a brake that selectively holds rotating elements of the planetary gear train stationary is formed around the lubricating oil supply port. Thus, in this power transmission device, leakage oil that leaks through a gap around the pump housing when the oil pump discharges hydraulic oil flows into the lubricating oil passage, and is supplied as lubricating oil to the clutch plate through the lubricating oil passage, the lubricating oil supply port, and the communication groove.

As this type of power transmission devices, another power transmission device is known which uses as a breather chamber a hollow portion of a countershaft that transmits power from an output shaft of a shift device to a differential mechanism, and which has a vent passage (vent pipe) that opens in the breather chamber, in order to eliminate a pressure difference between the inside and outside of the case which arises from variation in volume of hydraulic oil according to the temperature in the case accommodating a transmission (see, e.g., Japanese Patent Application Publication No. 2003-161362 (JP 2003-161362 A)). In this power transmission device, hydraulic oil is removed to the outer peripheral side in the breather chamber by using a gas-liquid separation action by a centrifugal force that is generated by rotation of the countershaft. This suppresses entry of the oil into the vent passage that opens in the breather chamber, regardless of an increase in oil level in the case.

SUMMARY OF THE INVENTION

If leakage oil of the oil pump is used as a lubricating medium for a bearing that supports a gear shaft having such a breather chamber as described in JP 2003-161362 A, a sufficient amount of leakage oil can be supplied to the bearing for lubrication by the pressure of the leakage oil itself. However, depending on the configuration of an oil passage connecting the oil pump to the bearing, the oil passage may be clogged with the leakage oil and the leakage oil may not be able to be satisfactorily supplied to the bearing if viscosity of the hydraulic oil increases due to the influence of the ambient environmental temperature, air being contained in the hydraulic oil, etc. If the oil passage is thus clogged with the leakage oil, the leakage oil cannot flow anywhere, which increases the oil pressure applied to the seal of the pump, and may degrade sealing capability. In the case where the breather chamber is formed in the gear shaft, the hydraulic oil may flow into the breather chamber of the gear shaft and the hydraulic oil having flown into the breather chamber may be discharged out of the case through the vent pipe, if an excessive amount of oil is supplied to the bearing supporting the gear shaft.

It is a primary object of the power transmission device of the present invention to satisfactorily lubricate a bearing supporting a gear shaft by using leakage oil of an oil pump, and to suppress discharge of hydraulic oil from a breather chamber formed in the gear shaft to the outside through a vent pipe.

The power transmission device of the present invention employs the following means in order to achieve the primary object.

A power transmission device according to an aspect of the present invention is a power transmission device including: a shift device accommodated in a case; and an oil pump that sucks and discharges hydraulic oil, characterized by further including: a gear to which power is transmitted from the shift device; a gear shaft which has a breather chamber having at least one end side in an axial direction being opened, and to which the gear is attached; a bearing that supports the gear shaft rotatably with respect to the case on the one end side of the breather chamber; a vent pipe that communicates with the opening of the breather chamber and outside of the case; a leakage oil passage that is formed in the case, that has an outlet port opening to inside of the case, and that allows leakage oil of the oil pump to flow out from the outlet port; a receiving member that receives the leakage oil flowing out from the outlet port of the leakage oil passage; a guide passage that guides the leakage oil received by the receiving member to the bearing; and an inflow suppressing portion that suppresses entry of thrown-up oil thrown up with rotation of the gear into the receiving member.

In this power transmission device, the leakage oil of the oil pump is supplied as lubricating oil to the bearing that supports the gear shaft having the breather chamber. That is, the leakage oil of the oil pump flows through the leakage oil passage formed in the case, flows to the inside of the case through the outlet port, and is received by the receiving member. The leakage oil thus received by the receiving member is supplied to the bearing through the guide passage. The outlet port of the leakage oil passage guiding the leakage oil of the oil pump to the bearing thus opens to the inside of the case (is opened to the atmosphere). This can suppress clogging of the leakage oil passage with the leakage oil even if viscosity of the hydraulic oil (leakage oil) increases due to the influence of the ambient environmental temperature, air being contained in the hydraulic oil, etc. Thus, the leakage oil can be sufficiently supplied from the outlet port to the bearing side through the receiving member and the guide passage, and degradation in sealing capability of the oil pump can be suppressed. However, if the leakage oil (hydraulic oil) has high viscosity, the leakage oil from the outlet port tends to be accumulated in the receiving member. If the thrown-up oil thrown up with rotation of the gear further flows into the receiving member having the leakage oil accumulated therein, an excessive amount of oil is supplied to the bearing supporting the gear shaft. In this case, the hydraulic oil may flow into the breather chamber of the gear shaft, and the hydraulic oil having flown into the breather chamber may be discharged out of the case through the vent pipe. In view of this, this power transmission device includes the inflow suppressing portion that suppresses entry of the thrown-up oil thrown up with rotation of the gear into the receiving member. This can suppress further entry of the thrown-up oil into the receiving member having the leakage oil accumulated therein. Thus, an excessive amount of oil is not supplied to the bearing supporting the gear shaft, whereby entry of the hydraulic oil into the breather chamber of the gear shaft can be suppressed. As a result, in this power transmission device, the bearing supporting the gear shaft can be satisfactorily lubricated with the leakage oil of the oil pump, and discharge of the hydraulic oil from the breather chamber formed in the gear shaft to the outside through the vent pipe can be suppressed.

The inflow suppressing portion may include a scattering suppressing portion that suppresses scattering of the thrown-up oil near the receiving member, and an inflow blocking portion that blocks entry of the thrown-up oil into the receiving member. This can more satisfactorily suppress entry of the thrown-up oil into the receiving member.

Moreover, the inflow suppressing portion may be a wall formed in at least one of the case and the receiving element. This facilitates configuration of the inflow suppressing portion. In the case where the inflow suppressing portion includes the scattering suppressing portion and the inflow blocking portion, a wall surrounding the gear near the receiving member is provided as the scattering suppressing portion in the case or the receiving member, and a wall covering at least a part of an opening receiving the leakage oil in the receiving member is provided as the inflow blocking portion in the case or the receiving member.

The power transmission device may further include: a counter drive gear to which the power is transmitted from the shift device; a counter driven gear that meshes with the counter drive gear; and a differential ring gear which is attached to a differential mechanism and to which power from the counter driven gear is transmitted, wherein the gear may be the counter driven gear. In this case, the counter driven gear rotates so as to throw up the hydraulic oil when the vehicle having the power transmission device mounted thereon moves in reverse. This can reduce the frequency at which the hydraulic oil is thrown up to the receiving member side by the counter driven gear, and can further reduce the possibility that an excessive amount of oil may be supplied to the bearing supporting the gear shaft when the viscosity of the hydraulic oil increases.

Moreover, each of the counter drive gear and the counter driven gear may be a helical gear, and a hand of helix of the counter driven gear may be such that the distance between each tooth of the counter driven gear and the counter drive gear increases in a direction toward an inner wall surface of the case. This allows the thrown-up oil to be directed away from the case side and from the counter drive gear when the counter driven gear rotates to throw up the hydraulic oil. Thus, entry of the thrown-up oil into the receiving member can be suppressed.

The receiving member may be fixed to the case so as to be located above a meshing part between the counter drive gear and the counter driven gear. Thus placing the receiving member in the space above the meshing part between the counter drive gear and the counter driven gear, which tends to be a dead space, can suppress an increase in size of the power transmission device associated with the placement of the receiving member.

DETAILED DESCRIPTION OF THE EMBODIMENTS

A mode for carrying out the present invention will be described below based on an embodiment.

Figure 1:
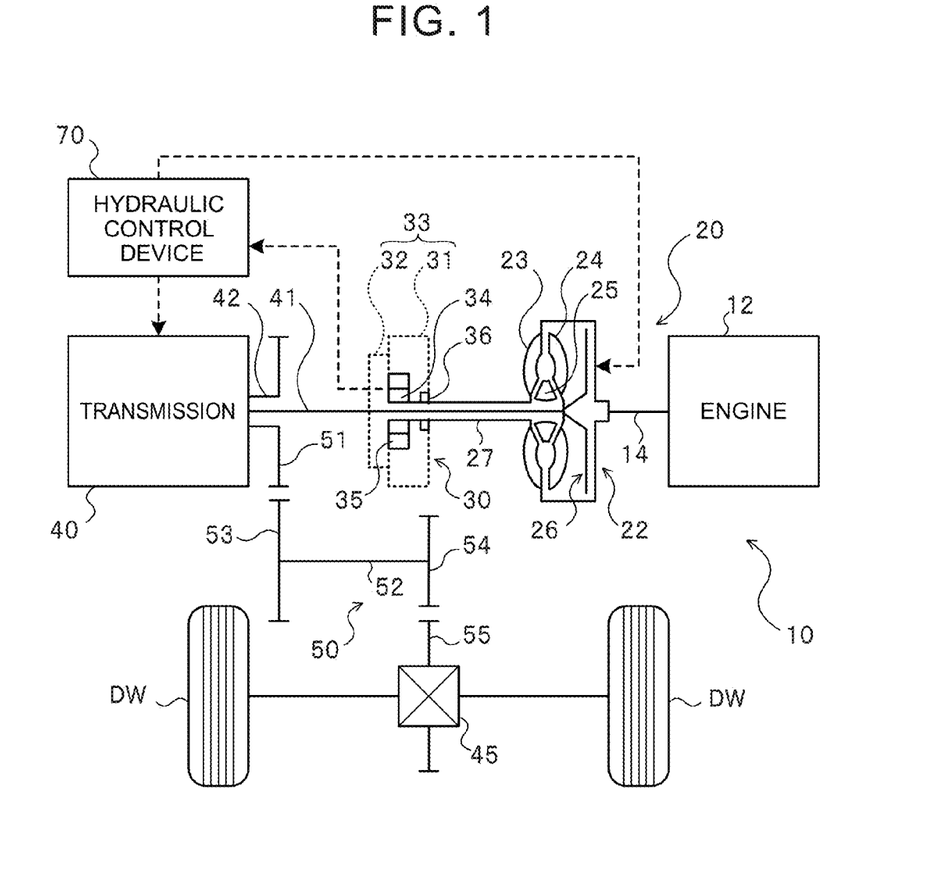
FIG. 1 is a schematic configuration view of a vehicle 10 having mounted thereon a power transmission device 20 according to an embodiment of the present invention.
Figure 2:
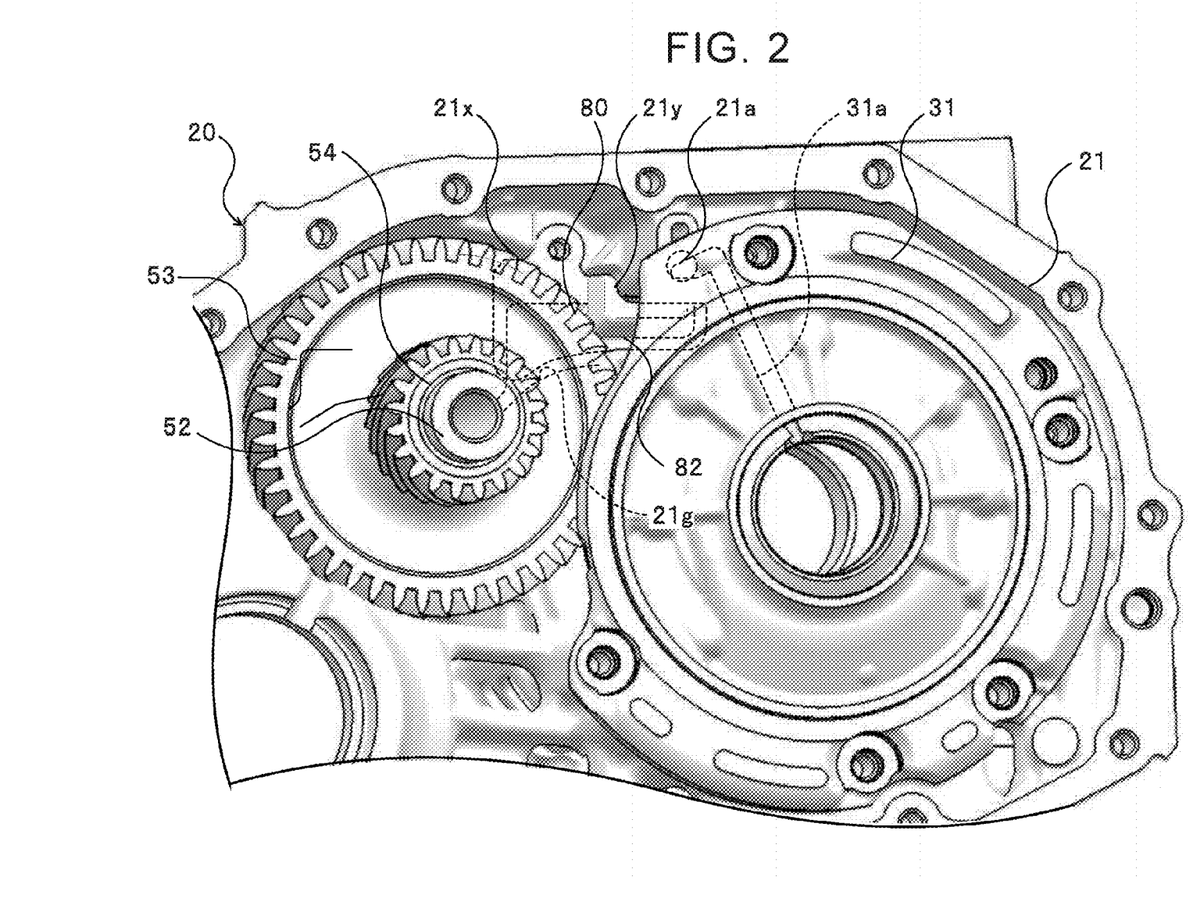
FIG. 2 is an enlarged perspective view showing a main part of the power transmission device 20.
Figure 3:
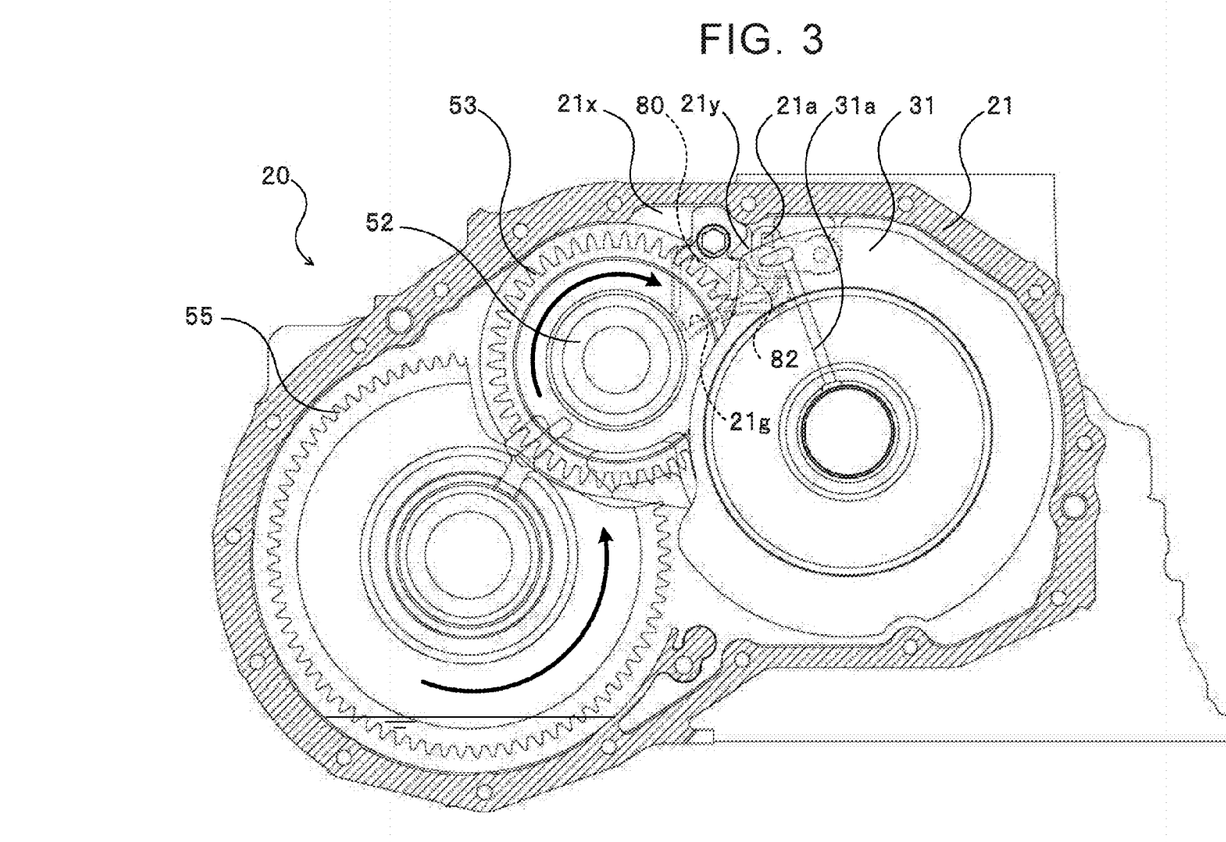
FIG. 3 is a partial sectional view showing a main part of the power transmission device 20.

FIG. 1 is a schematic configuration view of a vehicle 10 having mounted thereon a power transmission device 20 according to an embodiment of the present invention. FIG. 2 is an enlarged perspective view showing a main part of the power transmission device 20, and FIG. 3 is a partial sectional view showing a main part of the power transmission device 20. As shown in these figures, the power transmission device 20 is mounted on the front-wheel drive vehicle 10 to transmit power from an engine 12 to right and left driving wheels DW of the vehicle 10. The power transmission device 20 includes a hydraulic transmission device (starting device) 22, an oil pump 30 as an oil-pressure generating source, a stepped automatic transmission (shift device) 40, a gear mechanism 50 including a differential mechanism 45, a hydraulic control device 70 that regulates the pressure of hydraulic oil (ATF) from the oil pump 30 to supply the resultant hydraulic oil to the hydraulic transmission device 22 and the automatic transmission 40, a shifting electronic control unit, not shown, which controls the hydraulic control device 70 etc., a transmission case 21 (see FIGS. 2, 3, etc.) that accommodates these elements, etc.

The hydraulic transmission device 22 is configured as a hydraulic torque converter with a lockup clutch. The hydraulic transmission device 22 includes a pump impeller 23 that is connected to a crankshaft 14 of the engine 12, via a front cover, a turbine runner 24 that is fixed to an input shaft 41 of the automatic transmission 40 via a turbine hub, a stator 25 that adjusts the flow of hydraulic oil (ATF) from the turbine runner 24 to the pump impeller 23, a lockup clutch 26 having a damper mechanism, not shown, etc.

The oil pump 30 is configured as a so-called gear pump that is driven by the power of the engine 12. The oil pump 30 has: a pump assembly 33 including a pump body 31 fixed to the transmission case 21 and a pump cover 32; an external gear 34 connected to the pump impeller 23 via a hollow hub 27 that extends coaxially with the input shaft 41 of the automatic transmission 40, and rotatably disposed in the pump body 31; and an internal gear 35 disposed in the pump body 31 so as to be eccentric with respect to the external gear 34, and meshing with the external gear 34. The oil pump 30 suctions hydraulic oil stored in an oil pan (hydraulic oil storing portion), not shown, via, e.g., a suction oil passage formed in the pump cover 32, a strainer (not shown), etc. by rotation of the external gear 34 and the internal gear 35. The oil pump 30 discharges the hydraulic oil with an increased pressure from a discharge port, not shown, to supply the discharged hydraulic oil to the hydraulic control device 70 via, e.g., a discharge oil passage formed in the pump cover 32. The oil pump 30 further has an oil seal 36 that seals between the outer periphery of the hub 27 and the pump body 31 to suppress leakage of the hydraulic oil.

As shown in FIGS. 2 and 3, a first leakage oil passage 31*a* is formed in the pump body 31 in order to guide leakage oil of the oil pump 30, namely the hydraulic oil having failed to flow into the discharge port when discharged from the oil pump 30, as lubricating/cooling oil to an object to be lubricated and cooled. In the embodiment, as shown in the figures, the first leakage oil passage 31*a* is formed as a hole extending from near a central hole of the pump body 31 toward the outer periphery of the pump body 31 (obliquely upward). The leakage oil of the oil pump 30 has a certain level of pressure as the pressure of the leakage oil has been increased by the external gear 34 and the internal gear 35. The leakage oil of the oil pump 30 therefore flows into the inlet of the first leakage oil passage 31*a* via an oil groove etc., not shown, formed in the pump body 31, and flows upward in the first leakage oil passage 31*a* by its own pressure.

The automatic transmission 40 has a plurality of planetary gear mechanisms and a plurality of friction engagement elements (clutch and brake). By changing the engagement state of the plurality of friction engagement elements, the automatic transmission 40 can shift the power transmitted to the input shaft 41 to a plurality of shift speeds and output the shift speeds to an output shaft 42 extending coaxially with the input shaft 41. An oil pressure is supplied from the hydraulic control device 70 to the plurality of friction engagement elements of the automatic transmission 40. The automatic transmission 40 may have any number of shift speeds such as four, six, or eight shift speeds.

The gear mechanism 50 includes: a counter drive gear 51 attached to the output shaft 42 of the automatic transmission 40; a counter driven gear 53 attached to one end side of a countershaft 52 disposed parallel to the output shaft 42, and meshing with the counter drive gear 51; a differential pinion gear (final drive gear) 54 attached to the other end side of the countershaft 52; and a differential ring gear (final driven gear) 55 meshing with the differential pinion gear 54 and attached to the outer periphery of a differential case of the differential mechanism 45. The driving wheels DW are coupled to the differential mechanism 45 via right and left shafts.

Figure 4:
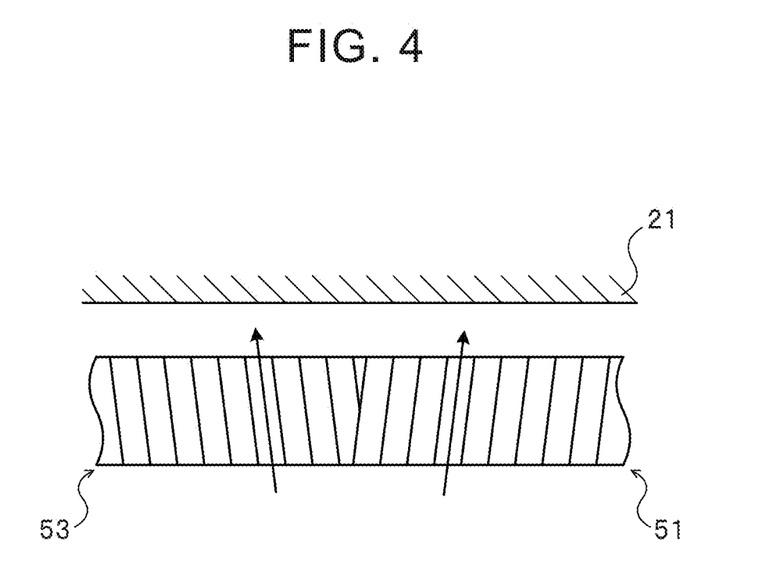
FIG. 4 is a schematic view illustrating the hand of helix of a counter drive gear 51 and a counter driven gear 53 of the power transmission device 20.

In the embodiment, helical gears are used as the counter drive gear 51, the counter driven gear 53, the differential pinion gear 54, and the differential ring gear 55. As shown in FIG. 4, the hand of helix of the counter drive gear 51 and the hand of helix of the counter driven gear 53 are determined so that the hand of helix of the counter drive gear 51 is upward to the right in a direction toward the inner wall surface of the transmission case 21, and the hand of helix of the counter driven gear 53 is upward to the left in the direction toward the inner wall surface of the transmission case 21. That is, the hand of helix of the counter driven gear 53 may be such that the distance between each tooth of the counter driven gear 53 and the counter drive gear 51 increases in a direction toward an inner wall surface of the case.

In the power transmission device 20 of the embodiment, the differential ring gear 55 rotates in the clockwise direction in FIG. 3 and the counter driven gear 53 rotates in the counterclockwise direction when the vehicle 10 moves forward. On the other hand, the differential ring gear 55 rotates in the counterclockwise direction as shown by arrow in FIG. 3 and the counter driven gear 53 rotates in the clockwise direction as shown by arrow in FIG. 3 when the vehicle 10 moves in reverse. Accordingly, when the vehicle 10 moves forward, the hydraulic oil accumulated in the bottom of the transmission case 21 is thrown up along the inner peripheral surface of the transmission case 21 by the differential ring gear 55 rotating in the clockwise direction in FIG. 3. Most of the hydraulic oil thrown up by the differential ring gear 55 is dropped to the bottom of the transmission case 21 by the counter driven gear 53 rotating in the opposite direction (counterclockwise direction in FIG. 3) from the differential ring gear 55. On the other hand, when the vehicle 10 moves in reverse, the hydraulic oil accumulated in the bottom of the transmission case 21 is thrown up by the differential ring gear 55 rotating in the counterclockwise direction in FIG. 3, and is further thrown up to the upper part of the transmission case 21 by the counter driven gear 53 rotating in the opposite direction (clockwise direction in FIG. 3) from the differential ring gear 55.

Figure 5:
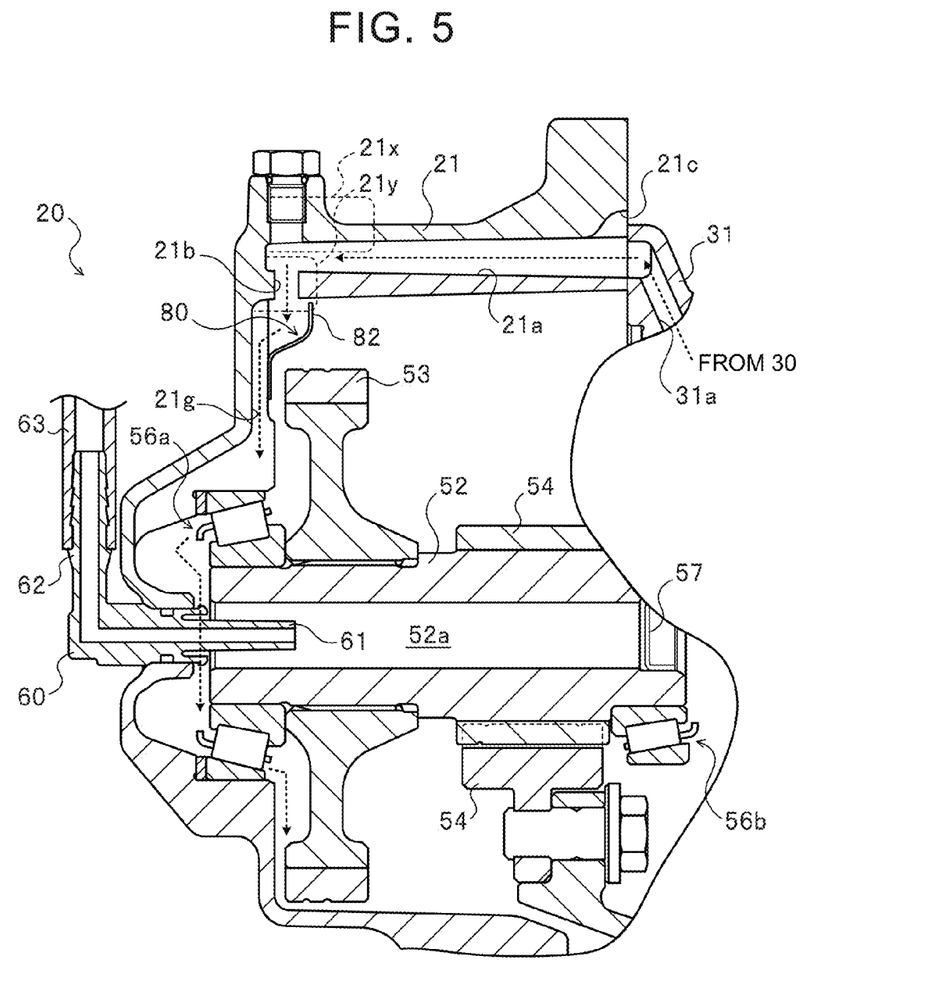
FIG. 5 is an enlarged sectional view showing a main part of the power transmission device 20.

FIG. 5 is an enlarged sectional view showing a main part of the power transmission device 20. As shown in the figure, the countershaft 52 is supported so as to be rotatable with respect to the transmission case 21 via a pair of bearings (thrust roller bearings) 56*a*, 56*b*. The countershaft 52 is hollow and has a central hole (through hole) extending coaxially with the countershaft 52. In the embodiment, the central hole of the countershaft 52 is used as a breather chamber 52*a* that eliminates by a so-called breathing action the pressure difference between the inside and outside of the case which arises from variation in volume of the hydraulic oil according to the temperature in the transmission case 21. In the embodiment, an opening on one end side (the transmission case 21 side, namely the left end side in the figure) of the central hole of the countershaft 52, that is, the breather chamber 52*a*, is opened, and an opening on the other end side (the right end side in the figure) is closed by a plug 57.

One end of a vent pipe 60 that is fixed to the transmission case 21 so as to extend therethrough is inserted in the opened opening (in the left end in the figure) of the breather chamber 52*a* (central hole) of the countershaft 52. In the embodiment, the vent pipe 60 is made of a resin etc. so as to have an approximately L shape, and has an inner end 61 and an outer end 62 each having an opening. As shown in FIG. 5, the inner end 61 of the vent pipe 60 has a smaller diameter than the inner diameter of the breather chamber 52*a*, and is inserted in the opening of the breather chamber 52*a* so as to extend coaxially with the countershaft 52, namely the breather chamber 52*a*. The outer end 62 of the vent pipe 60 is connected to one end of a hose 63 that has the other end opened to the atmosphere and that is fixed to the outer surface of the transmission case 21.

As can be seen from FIG. 5, the breather chamber 52*a* of the countershaft 52 thus communicates with the inside of the transmission case 21 through the periphery of the vent pipe 60, namely, a region where the automatic transmission 40 and the gear mechanism 50 are disposed, etc., and communicates with the outside of the transmission case 21, namely the atmosphere, through the vent pipe 60 and the hose 63. Accordingly, any pressure difference between the inside and outside of the transmission case 21, which arises from variation in volume of the hydraulic oil according to the temperature in the case, can be reduced by air flowing between the inside and outside of the case through the breather chamber 52*a* by the so-called breathing action.

In the embodiment, the leakage oil of the oil pump 30 is supplied as lubricating/cooling oil to the bearing 56*a* that supports one end of the countershaft 52 rotatably with respect to the transmission case 21. Accordingly, as shown in FIG. 5, a second leakage oil passage 21*a* is formed in the upper part of the transmission case 21 so as to extend approximately parallel to the countershaft 52 and to communicate with the first leakage oil passage 31$a$ formed in the pump body 31 of the oil pump 30. The second leakage oil passage 21$a$ has an outlet port 21$b$ that opens to the inside of the transmission case 21 at a position near (above) the counter driven gear 53, and allows the leakage oil from the oil pump 30 to flow out from the outlet port 21$b$ into the transmission case 21. In the embodiment, as shown in FIG. 5, an atmosphere opening hole 21$c$ is formed near the junction between the first leakage oil passage 31$a$ and the second leakage oil passage 21$a$ by using the mating surfaces of the transmission case 21 and the pump body 31.

Figure 6:
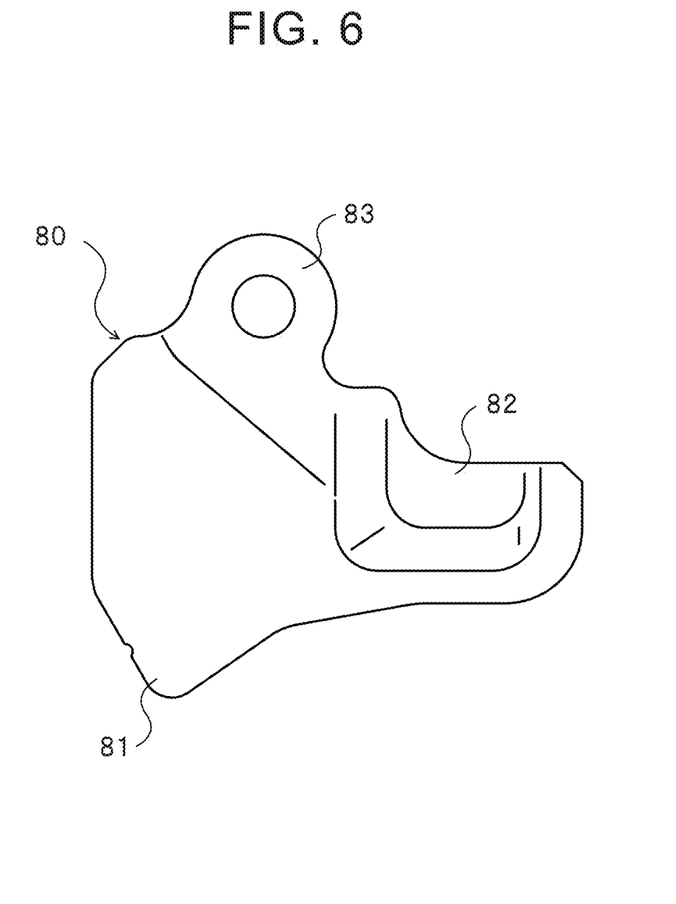
FIG. 6 is a plan view showing a receiving member 80.

A receiving member 80 is fixed to the inner wall surface of the transmission case 21 so as to be located above a meshing part between the counter drive gear 51 and the counter driven gear 53. Thus placing the receiving member 80 in the space above the meshing part between the counter drive gear 51 and the counter driven gear 53, which tends to be a dead space, can suppress an increase in size of the power transmission device 20 associated with the placement of the receiving member 80. The receiving member 80 is formed by press forming of a metal plate. As shown in FIG. 6, the receiving member 80 has a main body 81 formed to fit on the inner wall surface of the transmission case 21, a receiving portion 82 raised from the main body 81 so as to be able to temporarily store the leakage oil from the outlet port 21$b$, and a fastening portion 83 formed at the end of the main body 81. The receiving member 80 is fastened (fixed) to the transmission case 21 via a bolt that is inserted in the fastening portion 83, so that the receiving portion 82 is located below the outlet port 21$b$ of the second leakage oil passage 21$a$.

Figure 7:
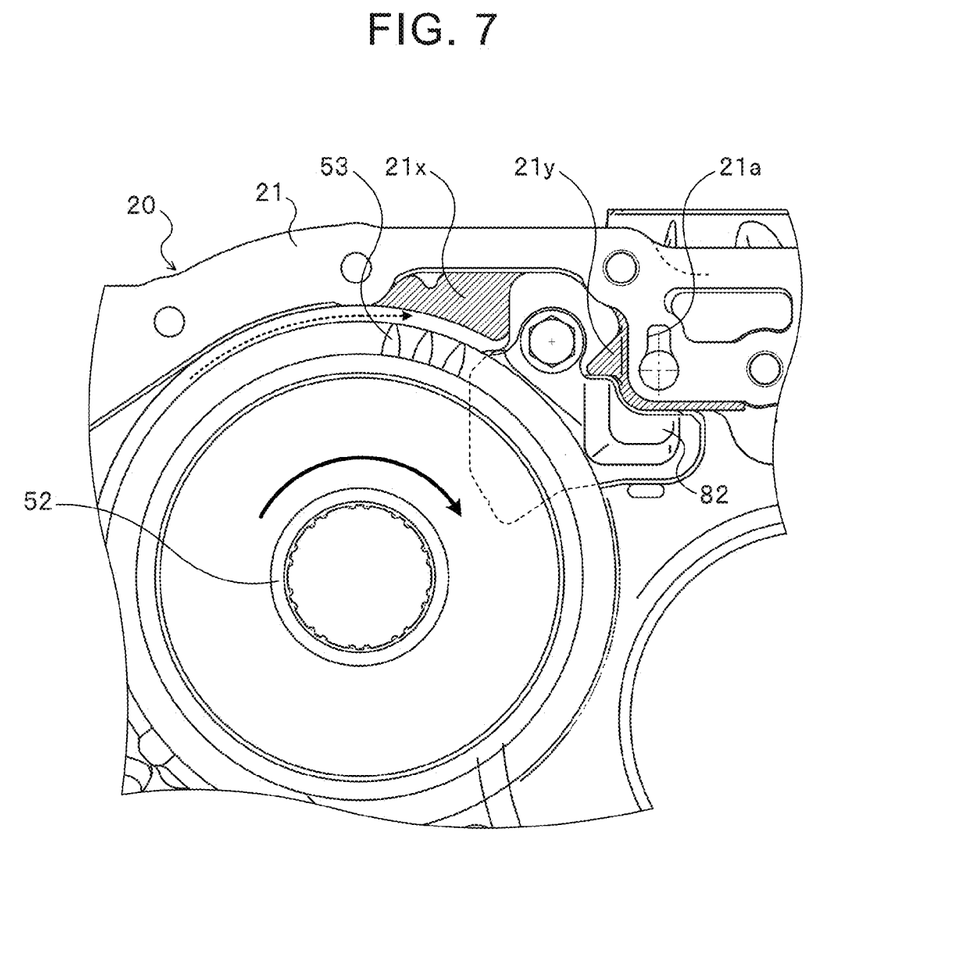
FIG. 7 is an enlarged partial sectional view showing a main part of the power transmission device 20.

Moreover, as shown in FIGS. 2, 3, and 5, a guide passage 21$g$ that guides the leakage oil received by the receiving portion 82 of the receiving member 80 to the bearing 56$a$ is formed in the inner wall surface of the transmission case 21 which faces one side surface of the counter driven gear 53. In the embodiment, the guide passage 21$g$ is a recess formed in the inner wall surface of the transmission case 21 so as to communicate with the receiving portion 82 of the receiving member 80 and to be located behind the main body 81. Hydraulic oil as lubricating/cooling oil is separately supplied through other oil passage, not shown, etc. to the bearing 56$b$ that rotatably supports the other end of the countershaft 52. In addition, as shown in FIGS. 2, 3, and 7, the transmission case 21 further has a scattering suppressing wall 21$x$ formed so as to surround the outer periphery of the counter driven gear 53 on the counter driven gear 53 side with respect to the receiving portion 82 of the receiving member 80, and an inflow blocking wall 21$y$ formed so as to cover the receiving portion (opening) 82 while allowing the outlet port 21$b$ to communicate with the receiving portion 82.

The procedures of lubricating/cooling the bearing 56$a$ that supports the countershaft 52 in the power transmission device 20 will be described.

When the oil pump 30 is driven by the power from the engine 12 in the vehicle 10 having the power transmission device 20 mounted thereon, the hydraulic oil having failed to flow into the discharge port when discharged from the oil pump 30, namely the leakage oil described above, flows upward in the first leakage oil passage 31$a$ in the pump body 31 by its own pressure, and flows into the second leakage oil passage 21$a$ formed in the transmission case 21. The leakage oil in the second leakage oil passage 21$a$ further flows into the transmission case 21 through the outlet port 21$b$ that opens above the meshing part between the counter drive gear 51 and the counter driven gear 53, and is received by the receiving portion 82 of the receiving member 80. The leakage oil thus received by the receiving portion 82 of the receiving member 80 is supplied to the bearing 56$a$ through the guide passage 21$g$ formed in the transmission case 21, and the leakage oil having passed through the gaps between rollers and races of the bearing 56$a$ and near the outer periphery of the inner end 61 of the vent pipe 60 flows down into the oil pan, not shown.

Viscosity of the hydraulic oil (leakage oil) increases when the ambient environmental temperature is low or when, e.g., air is contained in the hydraulic oil (including leakage oil) to be sucked/discharged by the oil pump 30 due to a part of a suction port of the strainer being exposed from the oil surface of the oil pan when, e.g., the vehicle 10 moves on a slope. Depending on the configuration of the oil passage connecting the oil pump 30 to the bearing 56$a$, such an increase in viscosity of the leakage oil may cause clogging of the oil passage with the leakage oil, and the leakage oil may not be able to be satisfactorily supplied to the bearing 56$a$. Accordingly, in the power transmission device 20 of the embodiment, the outlet port 21$b$ of the second leakage oil passage 21$a$ guiding the leakage oil of the oil pump 30 to the bearing 56$a$ opens to the inside of the transmission case 21 (is opened to the atmosphere). In the power transmission device 20 of the embodiment, the atmosphere opening hole 21$c$ is also formed at the junction between the first leakage oil passage 31$a$ and the second leakage oil passage 21$a$. This secures the flow of the leakage oil in the first leakage oil passage 31$a$ and the second leakage oil passage 21$a$ even if the viscosity of the hydraulic oil (leakage oil) increases due to the influence of the ambient environmental temperature, the air being contained in the hydraulic oil, etc. Clogging of the passages 31$a$, 21$a$ with the leakage oil can thus be satisfactorily suppressed. Accordingly, the leakage oil can be sufficiently supplied from the outlet port 21$b$ to the bearing 56$a$ as an object to be lubricated/cooled via the receiving portion 82 of the receiving member 80 and the guide passage 21$g$, and the bearing 56$a$ can be satisfactorily lubricated/cooled. The above configuration can also suppress degradation in sealing capability of the oil pump 30 which is caused when, e.g., the oil seal 36 comes off due to an increase in oil pressure in the oil pump 30 resulting from clogging of the first and second leakage oil passages 31$a$, 21$a$.

If the leakage oil (hydraulic oil) has high viscosity, it has reduced fluidity and thus is less likely to flow down along the guide passage 21$g$. The leakage oil from the outlet port 21$b$ therefore tends to be accumulated in the receiving portion 82 of the receiving member 80. If the vehicle 10 moves in reverse with the leakage oil being accumulated in the receiving portion 82 of the receiving member 80, the hydraulic oil that is thrown up by the counter driven gear 53 as described above (thrown-up oil) further flows into the receiving portion 82 of the receiving member 80, whereby an excessive amount of oil may be supplied to the bearing 56$a$ supporting the countershaft 52. Supplying an excessive amount of oil to the bearing 56$a$ may cause the hydraulic oil to flow into the breather chamber 52$a$ of the countershaft 52, and may cause the hydraulic oil having flown into the breather chamber 52$a$ to be discharged out of the transmission case 21 through the vent pipe 60 by the breathing action.

In view of the above, in the power transmission device 20 of the embodiment, the transmission case 21 has the scattering suppressing wall 21$x$ and the inflow blocking wall 21$y$ described above, which are formed to suppress entry of the thrown-up oil that is thrown up with rotation of the counter driven gear 53 into the receiving portion 82 of the receiving member 80. That is, as can be seen from FIG. 7, part of the thrown-up oil that is thrown up by the counter driven gear 53 collides with the scattering suppressing wall 21*x* and drops onto the bottom of the transmission case 21 before reaching near the receiving member 80 (see dotted line in the figure), thereby suppressing scattering of the thrown-up oil near the receiving member 80. As described above, the hand of helix of the counter driven gear 53 may be such that the distance between each tooth of the counter driven gear 53 and the counter drive gear 51 increases in a direction toward an inner wall surface of the case. Accordingly, in the power transmission device 20, the thrown-up oil can be directed away from the transmission case 21 side and from the counter drive gear 51 when the counter driven gear 53 rotates to throw up the hydraulic oil, and entry of the thrown-up oil to the receiving member 80 side can be suppressed. Even if the hydraulic oil is thrown up by the counter driven gear 53 and reaches near the receiving member 80, entry of the thrown-up oil into the receiving portion 82 is suppressed by the inflow blocking wall 21*y* disposed so as to cover the receiving portion 82.

The power transmission device 20 of the embodiment can thus highly satisfactorily suppress further entry of the thrown-up oil into the receiving member 80 having high viscosity leakage oil accumulated therein. The power transmission device 20 thus does not allow an excessive amount of oil to be supplied to the bearing 56*a* supporting the countershaft 52, and can suppress entry of the hydraulic oil into the breather chamber 52*a* of the countershaft 52. As a result, the power transmission device 20 can satisfactorily lubricate/cool the bearing 56*a* supporting the countershaft 52 by using the leakage oil of the oil pump 30, and can suppress discharge of the hydraulic oil from the breather chamber 52*a* formed in the countershaft 52 to the outside through the vent pipe 60.

As described above, the power transmission device 20 of the embodiment includes: the counter driven gear 53 to which power is transmitted from the automatic transmission 40; the countershaft 52 which has the breather chamber 52*a* having at least one end side in the axial direction being opened, and to which the counter driven gear 53 is attached; the bearing 56*a* that supports the countershaft 52 rotatably with respect to the transmission case 21 on the one end side of the breather chamber 52*a*; the vent pipe 60 that communicates with the opening of the breather chamber 52*a* and the outside of the transmission case 21; the second leakage oil passage 21*a* that is formed in the transmission case 21 and that allows the leakage oil of the oil pump 30 to flow out from the outlet port 21*b* opening to the inside of the case; the receiving member 80 having the receiving portion 82 that receives the leakage oil flowing out from the outlet port 21*b* of the second leakage oil passage 21*a*; the guide passage 21*g* that guides the leakage oil received by the receiving member 80 to the bearing 56*a*; and the scattering suppressing wall 21*x* and the inflow blocking wall 21*y* which suppress entry of the thrown-up oil thrown up with rotation of the counter driven gear 53 into the receiving portion 82.

Thus, even if the viscosity of the hydraulic oil (leakage oil) is increased due to the influence of the ambient environmental temperature, air contained in the hydraulic oil, etc., the power transmission device 20 can suppress clogging of the second leakage oil passage 21*a* with the leakage oil, thereby satisfactorily supplying the leakage oil to the bearing 56*a* side, and suppressing degradation in sealing capability of the oil pump 30. The power transmission device 20 can also suppress further entry of the thrown-up oil into the receiving portion 82 (receiving member 80) having the leakage oil accumulated therein, in the case where the leakage oil (hydraulic oil) has high viscosity. The power transmission device 20 does not allow an excessive amount of oil to be supplied to the bearing 56*a* supporting the countershaft 52, and can suppress entry of the hydraulic oil into the breather chamber 52*a* of the countershaft 52. As a result, the power transmission device 20 can satisfactorily lubricate the bearing 56*a* supporting the countershaft 52 by using the leakage oil of the oil pump 30, and can suppress discharge of the hydraulic oil from the breather chamber 52*a* formed in the countershaft 52 to the outside through the vent pipe 60.

Moreover, since the scattering suppressing wall 21*x* that suppresses scattering of the thrown-up oil near the receiving member 80 and the inflow blocking wall 21*y* that blocks entry of the thrown-up oil into the receiving portion 82 of the receiving member 80 are formed in the transmission case 21, entry of the thrown-up oil into the receiving portion 82 of the receiving member 80 can be easily and more satisfactorily suppressed. Instead of forming both the scattering suppressing wall 21*x* and the inflow blocking wall 21*y* in the transmission case 21, one or both of the scattering suppressing wall 21*x* and the inflow blocking wall 21*y* may be formed in the receiving member 80. One of the scattering suppressing wall 21*x* and the inflow blocking wall 21*y* may be omitted.

In the vehicle 10 having the power transmission device 20 of the embodiment mounted thereon, the counter driven gear 53 rotates so as to throw up the hydraulic oil when the vehicle 10 moves in reverse. Accordingly, in the case where the bearing 56*a* of the countershaft 52 to which such a counter driven gear 53 is attached is to be lubricated/cooled by the leakage oil of the oil pump 30, the frequency can be reduced at which the hydraulic oil is further thrown up by the counter driven gear 53 to the receiving member 80 side, namely toward the receiving portion 82 of the receiving member 80 having high viscosity leakage oil accumulated therein. This can further reduce the possibility that an excessive amount of oil may be supplied to the bearing 56*a* supporting the countershaft 52.

Moreover, in the embodiment, the hand of helix of the counter driven gear 53 may be such that the distance between each tooth of the counter driven gear 53 and the counter drive gear 51 increases in a direction toward an inner wall surface of the case. This allows the thrown-up oil to be directed away from the transmission case 21 side and from the counter drive gear 51 when the counter driven gear 53 rotates to throw up the hydraulic oil. Thus, entry of the thrown-up oil into the receiving portion 82 of the receiving member 80 can be satisfactorily suppressed. In the embodiment, the receiving member 80 is fixed to the transmission case 21 so as to be located above the meshing part between the counter drive gear 51 and the counter driven gear 53. Thus placing the receiving member 80 in the space above the meshing part between the counter drive gear 51 and the counter driven gear 53, which tends to be a dead space, can suppress an increase in size of the power transmission device 20 associated with the placement of the receiving member 80.

Correspondence between the primary elements of the embodiment and the primary elements of the invention described in "SUMMARY OF THE INVENTION" will be described. In the embodiment, the power transmission device 20 including the automatic transmission 40 accommodated in the transmission case 21 and the oil pump 30 suctioning and discharging hydraulic oil corresponds to the "power transmission device." The counter driven gear 53 to which power from the automatic transmission 40 is transmitted corresponds to the "gear." The countershaft 52 which has the breather chamber 52*a* having one end side in the axial direction being opened, and to which the counter driven gear 53 is attached corresponds to the "gear shaft." The bearing 56*a* that supports the countershaft 52 rotatably with respect to the transmission case 21 on the one end side of the breather chamber 52*a* corresponds to the "bearing." The vent pipe 60 communicating with the opening of the breather chamber 52a and the outside of the transmission case 21 corresponds to the "vent pipe." The second leakage oil passage 21a that is formed in the transmission case 21 and that allows the leakage oil of the oil pump 30 to flow out from the outlet port 21b opening to the inside of the transmission case 21 corresponds to the "leakage oil passage." The receiving member 80 that receives the leakage oil flowing out from the outlet port 21b of the second leakage oil passage 21a corresponds to the "receiving member." The guide passage 21g that guides the leakage oil received by the receiving member 80 to the bearing 56a corresponds to the "guide passage." The scattering suppressing wall 21x and the inflow blocking wall 21y which suppress entry of the thrown-up oil thrown up with rotation of the counter driven gear 53 into the receiving member 80 correspond to the "inflow suppressing portion." The correspondence between the primary elements of the embodiment etc. and the primary elements of the invention described in "SUMMARY OF THE INVENTION" is shown by way of example to specifically describe the mode in which the embodiment etc. carries out the invention described in "SUMMARY OF THE INVENTION." This correspondence is therefore not intended to limit the elements of the invention described in "SUMMARY OF THE INVENTION." That is, the embodiment etc. is merely a specific example of the invention described in "SUMMARY OF THE INVENTION," and the invention described in "SUMMARY OF THE INVENTION" should be construed based on the description therein.

Although the mode for carrying out the invention is described above based on the embodiment, it should be understood that the present invention is not limited in any way to the above embodiment, and various modifications can be made without departing from the spirit and scope of the present invention.

The present invention can be used in the industry of manufacturing power transmission devices.

The invention claimed is:

1. A power transmission device that comprises: a shift device accommodated in a case; and an oil pump that sucks and discharges hydraulic oil, comprising:
    a gear to which power is transmitted from the shift device;
    a gear shaft which has a breather chamber having at least one end side in an axial direction being opened, and to which the gear is attached;
    a bearing that supports the gear shaft rotatably with respect to the case on the one end side of the breather chamber;
    a vent pipe that communicates with the opening of the breather chamber and outside of the case;
    a leakage oil passage that is formed in the case, that has an outlet port opening to inside of the case, and that allows leakage oil of the oil pump to flow out from the outlet port;
    a receiving member that receives the leakage oil flowing out from the outlet port of the leakage oil passage;
    a guide passage that guides the leakage oil received by the receiving member to the bearing; and
    an inflow suppressing portion that suppresses entry of thrown-up oil thrown up with rotation of the gear into the receiving member.

2. The power transmission device according to claim 1, wherein
    the inflow suppressing portion includes a scattering suppressing portion that suppresses scattering of the thrown-up oil near the receiving member, and an inflow blocking portion that blocks entry of the thrown-up oil into the receiving member.

3. The power transmission device according to claim 1, wherein
    the inflow suppressing portion is a wall formed in at least one of the case and the receiving member.

4. The power transmission device according to claim 1, further comprising:
    a counter drive gear to which the power is transmitted from the shift device;
    a counter driven gear that meshes with the counter drive gear; and
    a differential ring gear which is attached to a differential mechanism and to which power from the counter driven gear is transmitted, wherein
    the gear is the counter driven gear.

5. The power transmission device according to claim 4, wherein
    each of the counter drive gear and the counter driven gear is a helical gear, and a hand of helix of the counter driven gear 53 may be such that the distance between each tooth of the counter driven gear 53 and the counter drive gear 51 increases in a direction toward an inner wall surface of the case.

6. The power transmission device according to claim 4, wherein
    the receiving member is fixed to the case so as to be located above a meshing part between the counter drive gear and the counter driven gear.

* * * * *